(12) United States Patent
Kondo

(10) Patent No.: US 7,121,635 B2
(45) Date of Patent: Oct. 17, 2006

(54) DEVICES FOR CONTROLLING BRAKE FLUID PRESSURE

(75) Inventor: Masuhiro Kondo, Obu (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/928,115

(22) Filed: Aug. 30, 2004

(65) Prior Publication Data
US 2005/0052078 A1 Mar. 10, 2005

(30) Foreign Application Priority Data
Sep. 8, 2003 (JP) .............................. 2003-315281

(51) Int. Cl.
*B60T 8/36* (2006.01)
(52) U.S. Cl. ........................ 303/119.3; 303/DIG. 10; 417/415
(58) Field of Classification Search ................ 303/10, 303/116.4, 119.3, DIG. 10; 417/415, 505, 417/523; 92/86, 72
See application file for complete search history.

(56) References Cited

U.S. PATENT DOCUMENTS

| | | | | |
|---|---|---|---|---|
| 5,449,226 A | * | 9/1995 | Fujita et al. ............. | 303/116.4 |
| 5,658,056 A | * | 8/1997 | Rischen et al. .......... | 303/119.2 |
| 5,769,508 A | * | 6/1998 | Gilles et al. ............. | 303/116.4 |
| 5,975,653 A | * | 11/1999 | Zaviska .................... | 303/116.4 |
| 6,142,751 A | * | 11/2000 | Krauter et al. ............... | 417/415 |
| 6,270,170 B1 | * | 8/2001 | Isogai et al. ............. | 303/119.3 |
| 6,443,537 B1 | * | 9/2002 | Koyama .................. | 303/119.3 |
| 6,616,248 B1 | * | 9/2003 | Obuse et al. ............ | 303/119.3 |
| 6,634,723 B1 | * | 10/2003 | Ganzel et al. ........... | 303/119.3 |
| 6,688,707 B1 | * | 2/2004 | Dinkel et al. ............ | 303/119.3 |

FOREIGN PATENT DOCUMENTS

JP 2000-52959 2/2000

* cited by examiner

*Primary Examiner*—James McClellan
*Assistant Examiner*—Mariano Sy
(74) *Attorney, Agent, or Firm*—Buchanan Ingersoll & Rooney PC

(57) ABSTRACT

A device used for controlling brake fluid pressure includes a plunger pump, for pressurizing brake fluid, and a drive motor for driving the plunger pump. The plunger pump and the output shaft of the drive motor are coupled together so as to transmit power through a cam mechanism arranged in a motor cam chamber. The motor cam chamber is provided with a communication passageway to allow brake fluid seepage to flow from the motor cam chamber to an interior chamber such as a solenoid chamber and/or one or more spring-enclosing chambers. The motor cam chamber is sealed from the exterior and brake fluid seeping into the motor cam chamber is contained within the interior of the device used for controlling brake fluid pressure.

18 Claims, 1 Drawing Sheet

DEVICES FOR CONTROLLING BRAKE FLUID PRESSURE

This application claims priority to Japanese patent application serial number 2003-315281, the contents of which are incorporated herein by reference.

BACKGROUND OF THE INVENTION

1. Field of the Invention

The present invention relates to devices for controlling brake fluid pressure used, for example, in an anti-lock brake system (ABS) and other like systems.

2. Description of the Related Art

Japanese Laid-Open Patent Publication No. 2000-52959 teaches a device for controlling brake fluid pressure comprising a plunger pump and a motor for driving the plunger pump. The plunger pump transfers brake fluid from a wheel cylinder into a reservoir provided in the body of the device for controlling brake fluid pressure. The plunger pump refluxes the brake fluid previously introduced into the reservoir to the side of the master cylinder. The plunger pump and the output shaft of the drive motor are coupled together to transmit power in a motor cam chamber provided in the body of the device for controlling brake fluid pressure. Further, there is a drain passage formed for draining the brake fluid seeping (leaking) by the plunger pump. The drain passage connects the motor cam chamber to the exterior. This device is additionally provided with a valve located in the drain passage in order to drain the brake fluid that seeped into the motor cam chamber and to prevent a sudden infiltration of water from the external environment. By using this device for controlling brake fluid pressure, the brake fluid that seeped into the motor cam chamber is drained through the drain passage, thereby preventing the grease of the bearing supporting the output shaft of the drive motor from being washed away by the brake fluid. Consequently, the draining of brake fluid from the motor cam chamber aids in preventing the bearing from being prematurely worn due to the depletion of grease and also aids in preventing the shortening of the life of the product. In addition, the valve provided in the drain passage prevents water from infiltrating into the drain passage when the device is submerged under water, for example.

However, though a sudden infiltration of water into the drain passage can be prevented, this device for controlling brake fluid pressure is not capable of completely preventing a relatively slow intake of water. For example, when the car is washed after having stopped the engine, the temperature in the motor cam chamber drops and the pressure therein decreases, causing water to be drawn into the motor cam chamber of the device for controlling brake fluid pressure.

SUMMARY OF THE INVENTION

It is an object of this invention to provide a device for controlling brake fluid pressure that is capable of draining the motor cam chamber of the brake fluid seepage and of preventing water from infiltrating into the interior of the device for controlling brake fluid pressure.

The device for controlling brake fluid pressure according to the invention includes a plunger pump for pressurizing brake fluid and a drive motor for driving the plunger pump. The plunger pump and the output shaft of the drive motor are coupled together so as to transmit power through a cam mechanism arranged in a motor cam chamber. The motor cam chamber is provided with a communication passage communicating with an interior chamber of the device for controlling brake fluid pressure. For example, the interior chamber may be configured as a solenoid chamber or a spring-enclosing chamber. The solenoid chamber encloses a solenoid for actuating a solenoid valve used to alter the fluid passageway of the brake fluid. The spring-enclosing chamber encloses a spring used as a component for a reservoir that stores brake fluid in order to lower the hydraulic pressure of the fluid. The communication passage may allow communication with one or more interior chambers of the device for controlling brake fluid pressure. The motor cam chamber is sealed from the exterior environment.

According to this invention, the brake fluid seeped into the motor cam chamber can be drained through the communication passageway to at least one interior chamber of the device for controlling brake fluid pressure. Typically, the fluid will be drained to either one of at least two spaces constituted in the device for controlling brake fluid pressure, i.e., the brake fluid seepage can be drained into the solenoid chamber and/or the spring-enclosing chamber. In this case, since the brake fluid seeping by the plunger pump is stored within the device for controlling brake fluid pressure, there is no need of providing a separate drain passageway for emptying the brake fluid seepage to the exterior of the device. Therefore, water is not able to infiltrate into the device for controlling brake fluid pressure through the drain passageway.

According to the present invention as described above, there is provided a device for controlling brake fluid pressure capable of draining the motor cam chamber of brake fluid seepage and capable of preventing water from infiltrating into the interior of the device.

The communication passage may be connected to either or both of the solenoid chamber or the spring-enclosing chamber, but the passageway is preferably connected to (communicates with) both of the chambers.

It is further desired that an interior chamber (for example at least one of the solenoid chamber and the spring-enclosing chamber) be positioned lower than the motor cam chamber. The brake fluid entering into the motor cam chamber may then fall (or be propelled) into the lower chamber due to the force of gravity.

Additionally, it is desired that the communication passage include a flow-down passageway that extends nearly vertically downward from the motor cam chamber and has a closed lower end. The communication passage should include at least one branched passage branched off of the flow-down passageway. The branched passages may communicate with at least one or both of the solenoid chamber and the spring-enclosing chambers.

It is also desired that the chamber(s) connected to communication passage is sealed from the exterior.

Even further, it is desired that a reservoir include a reservoir piston, a reservoir chamber, and the spring-enclosing chamber. The reservoir piston may separate the reservoir chamber and the spring-enclosing chamber from one another. The spring may urge the reservoir piston toward the reservoir chamber.

Still further, it is desired that the motor cam chamber, the solenoid chamber, and the spring-enclosing chamber, be formed in an integrated housing.

It is further desired that the housing be provided with a space for enclosing an electronic control unit for controlling the solenoid valves.

DETAILED DESCRIPTION OF THE INVENTION

Each of the additional features and teachings disclosed above and below may be utilized separately or in conjunction with other features and teachings to provide improved devices for controlling brake fluid pressure and methods of using such improved devices for controlling brake fluid pressure. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A representative embodiment of the present invention will now be described with reference to the drawings.

Figure 1:
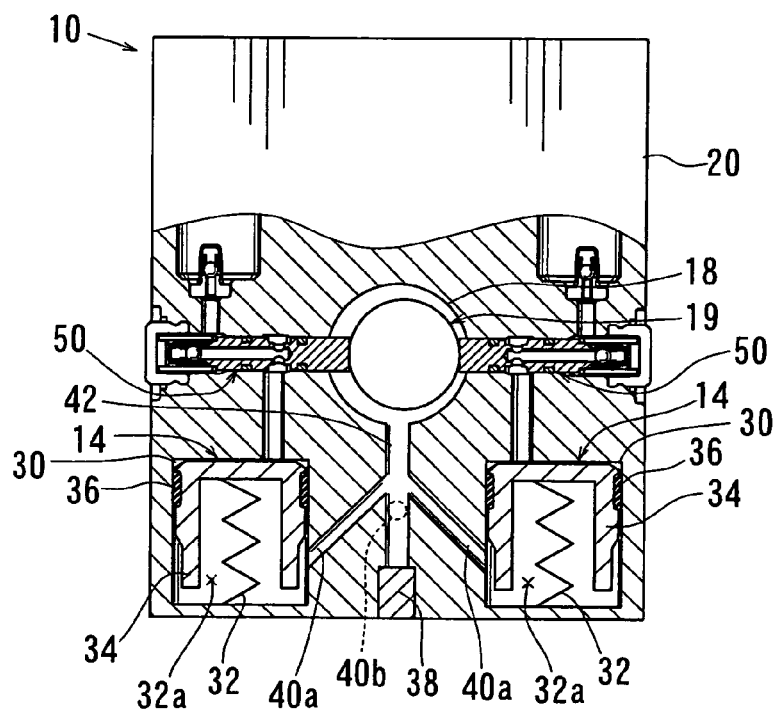
FIG. 1 is a partly cross-sectional front view illustrating a device for controlling brake fluid pressure according to an embodiment of the invention.
Figure 2:
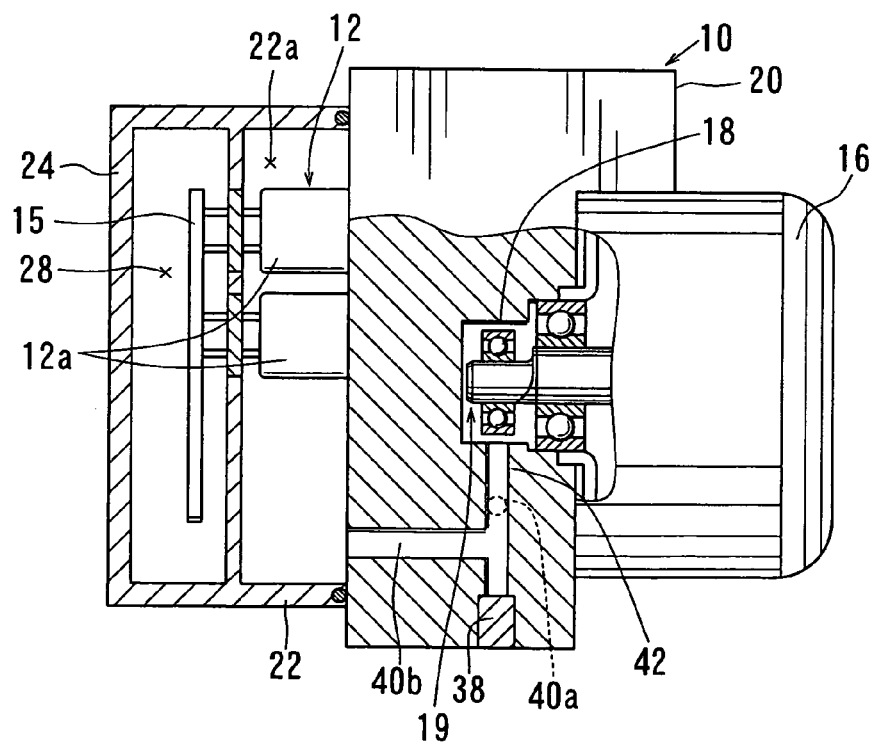
FIG. 2 is a partly cross-sectional side view illustrating the device for controlling the brake fluid pressure illustrated in FIG. 1.

FIG. 1 is a front view illustrating, partially in cross-section, a representative device 10 for controlling brake fluid pressure according to the embodiment. FIG. 2 is a side view illustrating, also partially in cross-section, the device 10 for controlling brake fluid pressure illustrated in FIG. 1. The device 10 for controlling brake fluid pressure according to the embodiment is one provided in a brake system (not shown) that transmits the brake depressing force applied to the master cylinder via the brake fluid, as a force transferring medium, to the wheel cylinders. The device 10 is able to alter the pressure of the hydraulic fluid in a controlled fashion. The brake system itself has been widely known and is not described in detail here.

As shown in FIGS. 1 and 2, the device 10 for controlling brake fluid pressure is constituted by the integration of a plurality of elements such as solenoid valves 12, for changing the passageways or hydraulic circuits of the brake fluid and solenoids 12a for the corresponding solenoid valves 12. The device 10 may further include plunger pumps 50, for increasing the pressure of the brake fluid, a drive motor 16 for driving the plunger pumps 50, and reservoirs 14 for temporarily storing brake fluid in the brake system in order to decrease hydraulic pressure. The device 10 for controlling brake fluid pressure may also include an electronic control unit 15 (ECU) for controlling the operations of the drive motor 16 and the solenoid valves 12.

As shown in FIGS. 1 and 2, the device 10 for controlling brake fluid pressure includes a solenoid case 22, for enclosing the solenoids 12a, and an electronic control unit case 24, formed integrally with the solenoid case 22 so as to cover the electronic control unit 15. These two cases are may be formed into the shape of a lid by the injection-molding of an appropriate molding material, for example, a thermoplastic synthetic resin. The solenoid case 22 inhibits water from infiltrating into the solenoid chamber 22a enclosing the solenoids 12a. The electronic control unit case 24 inhibits water from infiltrating into space 28 enclosing the electronic control unit 15.

As shown in FIG. 2, solenoid valves 12 are mounted in a housing 20 that constitutes the body of the device 10 for controlling brake fluid pressure. In this embodiment, the solenoid valves 12 are mounted in a manner so as to protrude substantially horizontally. The solenoid valves 12 are electrically connected to the electronic control unit 15 and work to change or alter the fluid passageways of the brake fluid. The solenoid valves 12 are actuated with suitable timing upon receiving a control signal from the electronic control unit 15.

As shown in FIG. 1, the reservoirs 14, provided in the housing 20, include a reservoir chamber 30, for temporarily storing brake fluid, a reservoir piston 34 concentrically contained within the reservoir chamber 30, and a spring 32 for resiliently urging the reservoir piston 34 toward the upper end of the reservoir chamber 30. An O-ring 36 is provided on the outer peripheral surface of the reservoir piston 34 in order to slidingly seal a gap between the inner surface of the reservoir chamber 30 and the outer peripheral surface of the reservoir piston 34. The reservoirs 14 are further provided with a spring-enclosing chamber 32a for enclosing the spring 32. In order to decrease the hydraulic pressure of the brake fluid by the device 10 for controlling brake fluid pressure, the electronic control unit 15 sends a control signal to the solenoid valves 12 to alter the fluid passageways so that brake fluid is sent to and stored in the reservoir chambers 30.

The output shaft of the drive motor 16 is coupled to the plunger pumps 50 via an eccentric cam mechanism 19 so as to transmit power. The driving system is located in the motor cam chamber 18 provided in the housing 20. As shown in FIGS. 1 and 2, the motor cam chamber 18 communicates with spring-enclosing chambers 32a via first communication passages 40a and the motor cam chamber 18 communicates with the solenoid chamber 22a via a second communication passage 40b. Due to the provision of the first communication passages 40a and the second communication passage 40b, the brake fluid seepage in the motor cam chamber 18 can be respectively drained into the spring-enclosing chambers 32a and into the solenoid chamber 22a.

In the portion where the plunger pump and the drive motor are mechanically coupled together in the device 10 for controlling brake fluid pressure, it has been generally known that the brake fluid often seeps into the motor cam chamber little by little through the sliding portion of the plunger as the plunger undergoes a repetitive piston motion. In the device 10 for controlling brake fluid pressure according to this embodiment, the brake fluid seeping into the motor cam chamber 18 due to the operation of the plunger pump 50 may be drained into the spring-enclosing chambers 32a and/or into the solenoid chamber 22a. Consequently, there is no need of separately providing a drain passage for draining the brake fluid out of the housing 20 into the outside environment. The lack of access to the outside environment helps in eliminating a problem inherent in the prior art of water infiltrating into the interior of device 10 for controlling brake fluid pressure via a drain passage communicating with the environment exterior to the housing 20.

It has been known that the amount of brake fluid seeping into the motor cam chamber 18 is approximately several milliliters at the greatest throughout the life of the vehicle. Therefore, even if the brake fluid seepage is never released to the environment exterior to the housing 20, the spring-enclosing chambers 32a and the solenoid chamber 22a have sufficient capacities for receiving the total amount of brake fluid seeping into the motor cam chamber 18 throughout the entire life of the vehicle.

As shown in FIGS. 1 and 2, a flow-down passageway 42 is provided below the motor cam chamber 18. The flow-down passageway 42 is oriented in a vertical direction in order to allow the brake fluid seeping into the motor cam chamber 18 to flow downward, out of the motor cam chamber 18. The first communication passages 40a and the second communication passage 40b are branched from the flow-down passageway 42 and are respectively connected to the spring-enclosing chambers 32a and the solenoid chamber 22a. A plug 38 is attached to the lower end of the flow-down passageway 42 in order to seal the flow-down passageway 42. The motor cam chamber 18 is sealed within the housing 20. Upon attaching the plug 38, there is no passageway for communicating between the motor cam chamber 18 and the environment exterior to the housing 20. As a result of the seal, no water, dust, or dirt, is permitted to infiltrate into the interior of device 10 for controlling brake fluid pressure.

Though the above embodiment indicates an example involving a motor cam chamber 18 respectively communicating with the spring-enclosing chambers 32a and the solenoid chamber 22a, through the first communication passages 40a and the second communication passage 40b, it should be noted that the invention is in no way limited to only this configuration. The motor cam chamber 18 may communicate with only one of the interior chambers, for example, the spring-enclosing chambers 32a or the solenoid chamber 22a. As an additional example, the motor cam chamber 18 may only communicate with the solenoid chamber 22a.

In the above embodiment, a pair of right and left reservoirs 14 (see FIG. 1) were provided for storing brake fluid and the motor cam chamber 18 communicated with the spring-enclosing chambers 32a in both the left and right reservoirs 14. However, the invention is in no way limited to only the above embodiment. The motor cam chamber may communicate with the spring-enclosing chamber 32a of either the left or the right reservoirs 14, if the spring-enclosing chamber 32a is capable of receiving the amount of brake fluid seeping into the motor cam chamber 18.

In the above embodiment, it is also indicated that the plug 38 was attached to the lower end of the flow-down passageway 42 in order to seal the passageway. However, any other means may be used to seal the flow-down passageway 42.

What is claimed is:

1. A device for controlling brake fluid pressure comprising:
    a plunger pump for pressurizing a brake fluid;
    a drive motor having an output shaft for driving the plunger pump;
    a motor cam chamber enclosing a cam mechanism which couples the plunger pump to the output shaft of the drive motor so as to transmit power from the drive motor to the plunger pump, the motor cam chamber being sealed from an exterior environment;
    at least one interior chamber comprising a solenoid chamber enclosing at least one solenoid, located within the device, in addition to the motor cam chamber;
    a communication passage establishing communication between the motor cam chamber and the solenoid chamber;
    wherein brake fluid seeping into the motor cam chamber is able to exit the motor cam chamber and flow into the solenoid chamber.

2. The device for controlling brake fluid pressure according to claim 1, wherein the solenoid chamber encloses said at least one solenoid for a corresponding at least one solenoid valve for changing at least one fluid passageway of the brake fluid.

3. The device for controlling brake fluid pressure according to claim 1, wherein the at least one interior chamber further comprises at least one spring chamber enclosing a spring for a reservoir that stores brake fluid so as to decrease a hydraulic pressure of the brake fluid.

4. The device for controlling brake fluid pressure according to claim 3, wherein the solenoid chamber encloses said at least one solenoid for a solenoid valve for changing a fluid passage of the brake fluid;
    wherein the communication passage is connected to the solenoid chamber and at least one spring chamber.

5. The device for controlling brake fluid pressure according to claim 1, wherein the solenoid chamber is positioned lower than the motor cam chamber, and
    wherein the brake fluid seeping into the motor cam chamber is urged into the solenoid chamber due to a force of gravity.

6. The device for controlling brake fluid pressure according to claim 5, wherein the communication passage further includes;
    a flow-down passageway which extends substantially vertically downward
    from the motor cam chamber and comprises
        a closed end opposite to an open end communicating with the motor cam chamber, and
        at least one branched passage connected to the flow-down passageway; and
    wherein the at least the one branched passage communicates with a the solenoid chamber.

7. The device for controlling brake fluid pressure according to claim 1, wherein the solenoid chamber is sealed from the exterior environment.

8. The device for controlling the brake fluid pressure according to claim 3, wherein the reservoir further comprises
    a reservoir piston, and
    a reservoir chamber
    wherein the spring-enclosing chamber is separated from the reservoir by the reservoir piston and
    wherein the spring urges the reservoir piston toward the reservoir chamber.

9. The device for controlling brake fluid pressure according to claim 1, wherein the motor cam chamber and the solenoid chamber are formed in an integral housing.

10. The device for controlling brake fluid pressure according to claim 4, wherein the motor cam chamber, the solenoid chamber, and the at least one spring chamber are formed in an integral housing.

11. The device for controlling brake fluid pressure according to claim 10, wherein the housing is further provided with a space for enclosing an electronic control unit controlling the at least one solenoid valve.

12. A device for controlling brake fluid pressure comprising:
- a plunger pump for pressurizing a brake fluid;
- a drive motor having an output shaft for driving the plunger pump;
- a motor cam chamber enclosing a cam mechanism which couples the plunger pump to the output shaft of the drive motor so as to transmit power from the drive motor to the plunger pump, the motor cam chamber being sealed from an exterior environment;
- a solenoid chamber enclosing at least one solenoid for a corresponding at least one solenoid valve for changing a corresponding fluid passageway of brake fluid; at least one spring chamber enclosing a corresponding spring for a reservoir that stores brake fluid so as to decrease the hydraulic pressure of the brake fluid;
- a communication passage establishing communication between the motor cam chamber and at least the solenoid chamber;
- wherein brake fluid seeping into the motor cam chamber is able to exit the motor cam chamber and flow into at least the solenoid chamber;
- wherein a system comprising the motor cam chamber, the communication passage, and at least one of the solenoid chamber and the at least one spring chamber is sealed from the exterior environment.

13. The device for controlling brake fluid pressure according to claim 12, wherein the communication passage communicates with two or more of the solenoid chamber and the at least one spring chamber.

14. The device for controlling brake fluid pressure according to claim 12 wherein the at least one of the solenoid chamber and the at least one spring chamber is located lower than the motor cam chamber, and
- wherein at least a portion of the brake fluid seeping into the motor cam chamber flows into the at least one of the solenoid chamber and the at least one spring chamber via the force of gravity.

15. A device for controlling brake fluid pressure comprising:
- a plunger pump for pressurizing a brake fluid;
- a drive motor for driving the plunger pump;
- a motor cam chamber sealed from an exterior environment;
- at least one interior chamber comprising a solenoid chamber enclosing at least one solenoid, located within the device, in addition to the motor cam chamber; and
- a communication passage establishing communication between the motor cam chamber and the solenoid chamber;
- wherein brake fluid seeping into the motor cam chamber is able to exit the motor cam chamber and flow into the solenoid chamber.

16. The device for controlling brake fluid pressure according to claim 15, wherein the solenoid chamber encloses said at least one solenoid for a corresponding at least one solenoid valve for changing at least one fluid passageway of the brake fluid.

17. The device for controlling brake fluid pressure according to claim 15, wherein the at least one interior chamber further comprises at least one spring chamber enclosing a spring for a reservoir that stores brake fluid so as to decrease a hydraulic pressure of the brake fluid.

18. The device for controlling brake fluid pressure according to claim 17, wherein the solenoid chamber encloses said at least one solenoid for a solenoid valve for changing a fluid passageway of the brake fluid; wherein the communication passage is connected to the solenoid chamber and at least one spring chamber.

* * * * *